United States Patent Office 3,115,722
Patented Dec. 31, 1963

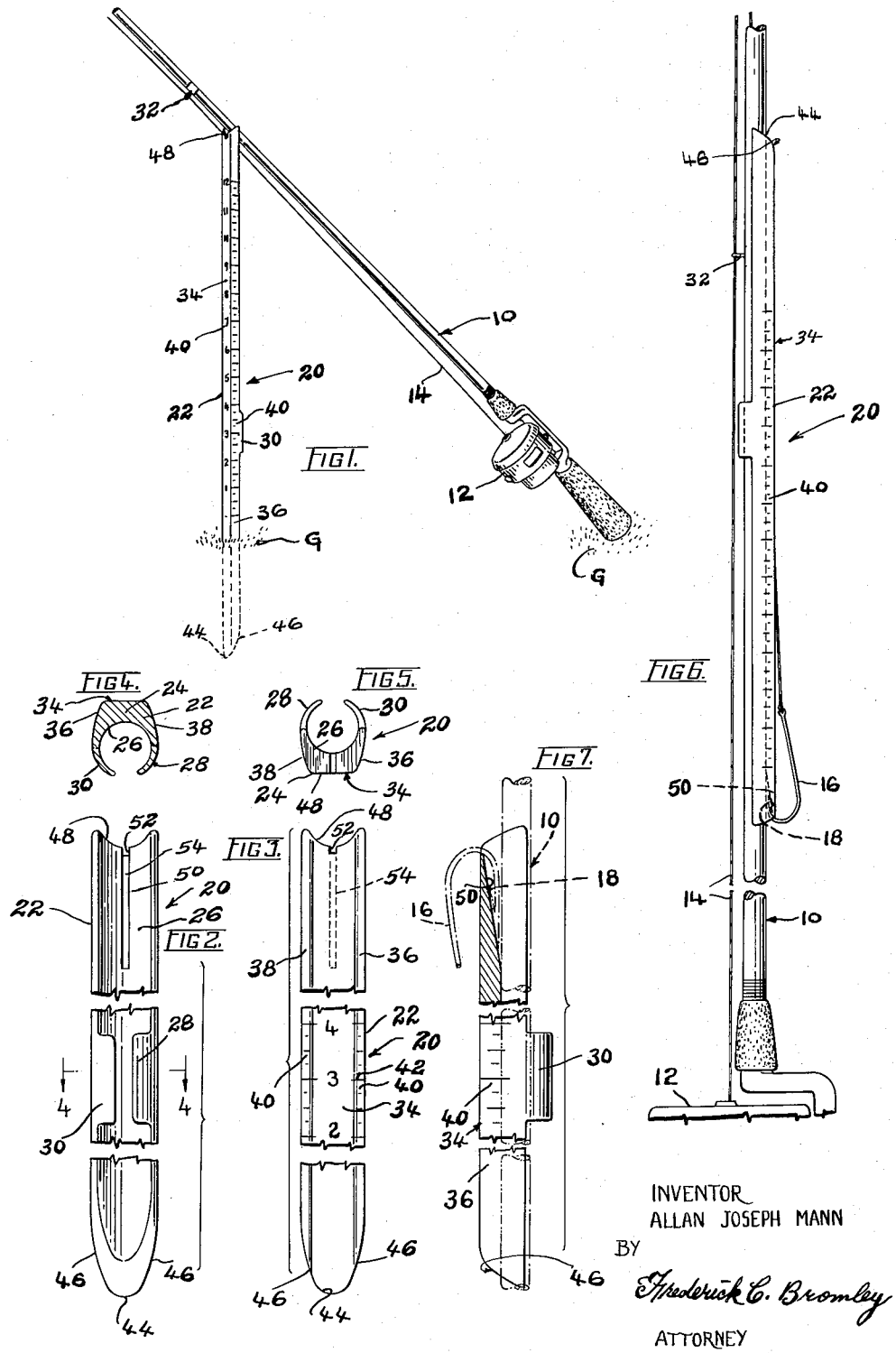

3,115,722
MULTI-PURPOSE FISHING TOOL
Allan Joseph Mann, 318 Egerton St.,
London, Ontario, Canada
Filed Jan. 18, 1963, Ser. No. 252,329
3 Claims. (Cl. 43—21.2)

This invention relates generally to an improved accessory for a fisherman.

Oftentimes, a fisherman desires to rest his rod on the banks of a stream, etc., in angular relation to a horizontal supporting surface after he has cast, for example. He generally must rest the rod on his tackle box, on a Y-shaped stick, etc.

Further, after a fish is landed, the hook must at times be pried from the fish's mouth, this generally requiring a pair of pliers, etc.

Still further, oftentimes the fisherman desires to transport his equipment, with the hooks still attached to his line, this constituting a potential danger whereby the hook may become lodged in the fisherman or others nearby. The fisherman must generally embed the barb of the hook in a cork, for example, or temporarily hook the barb into his reel at a convenient projecting portion.

A primary object of the present invention is to provide an improved, multi-purpose fishing tool.

Another object of the present invention is to provide a novel multi-purpose fishing tool which is conveniently removably stored or attached onto the fisherman's rod and provides means whereby hook barbs may be readily attached thereto in a protected relation, and when the tool is removed from the rod, it provides a prying-type tool or lever and/or a vertical support readily driven into a support surface for providing means whereby the rod may be supported in angular relation to the support surface.

These together with other objects and advantages will become apparent upon a consideration of the accompanying drawings forming a part thereof, wherein:

In the drawings:

FIGURE 1 is a perspective view showing one use of the novel fishing tool of the invention;

FIGURE 2 is an enlarged rear elevational view of the novel tool looking substantially from right to left at FIGURE 1, intermediate portions being removed;

FIGURE 3 is an enlarged front elevation similar to FIGURE 2, looking from left to right at FIGURE 1;

FIGURE 4 is a section taken substantially on the plane of line 4—4 of FIGURE 2, through the clamp means of the tool;

FIGURE 5 is a top plan view looking at the upper end of FIGURE 3;

FIGURE 6 is an inverted side elevational view, on still another scale, showing the novel tool mounted on an intermediate portion of a rod, and illustrating the manner in which a hook barb is protectively engaged thereon; and FIGURE 7 is an enlarged, side elevation of a portion of FIGURE 3 looking from right to left, with portions broken away and removed in order to show details.

Referring to the drawing in detail, a typical fishing rod is indicated generally at 10, the rod having mounted thereon a spinning reel 12, or the like, which includes a line 14 to which is suitably secured a hook 16. The hook 16 includes the usual reverse-bend barb or bill portion 18.

A preferred embodiment of the novel fishing tool is indicated generally at 20 and comprises an elongated, relatively rigid body member 22 produced from a molded plastic, fiber glass, aluminum, etc.

The body member 22 will preferably be approximately two feet long, having a solid back 24; see FIGURES 4 and 5, including a longitudinal concave groove 26 extending the length thereof; see FIGURES 2, 4 and 5.

The groove 26 will substantially conform to the outer surface of the rod 10 and may be removably secured thereon by means of clamp means on the body member.

The clamp means in this exemplary embodiment comprises opposed, arcuate spring-fingers 28 and 30 which are integral with the body member 24 and are preferably intermediately thereof. The spring fingers 28 and 30 can embrace the pole 10 as clearly seen in FIGURES 6 and 7, and straddle the conventional eyes 32 of the pole 10.

The body member 22, it will be noted, includes a flat outer surface 34 flanked by angular surfaces 36 and 38. One or both of the surfaces 36 and 38 have formed thereon a measuring scale 40, and the surface 34 will have numerical indicia 42 thereon in alignment with appropriate portions of the scales 40. The scale will be available for the purpose of measuring the length of a fish caught.

The lower end of the body member 22 is rounded transversely at 44 and tapers longitudinally as indicated at 46; see FIGURES 1, 2, 3 and 7. This construction facilitates driving the tool into the ground G as seen in FIGURE 1, and yet the lower end of the tool is relatively flat to avoid accidental injury to the user.

The upper end of the body member 22 has formed therein a substantially U or V-shaped notch portion 48 which will receive the rod 10 therein when it is supported in angular relation to the ground G as seen in FIGURE 1.

The upper end of the body member 22 has formed thereon a recess portion or undercut portion 50 preferably extending angularly and longiudinally from the outer surface of the body member to a lower portion of the groove 26; see FIGURES 6 and 7. The recess portion 50 will receive the barb or bill 18 of the fishhook therein when the rod and reel are transported or stored with the hook 16 still attached.

The upper end of the body member 22 includes a transverse secondary notch 52 which is disposed below the primary notch 48. The secondary notch 52 communicates with a longitudinal groove 54 formed on the inner surface of the body member 22 along the recess 50. The secondary notch 52 and communicating groove 54 provide means for insuring a good seat for the hook when it is stored in the condition shown in FIGURES 6 and 7.

The primary notch 48 and secondary notch 52 and groove 54 provide means whereby an impacted hook may be dislodged if it has been swallowed by a fish that has been caught. This is accomplished by inserting the tool into the fish's mouth until the curved portion of the hook is engaged in groove 52, it being noted that the primary notch 48 will substantially guide the tool into its proper position with respect to the hook. The fish is then firmly grasped in the fiisherman's one hand, and by continued inward thrust of the tool, the hook barb will be released.

Thus there has been disclosed a multi-purpose fishing tool which provides (1) a support upon which a rod can rest while fishing, (2) means whereby a hook barb may be engaged, protected, stored and yet be available for immediate use, (3) means whereby a hook may be dislodged from a fish's mouth, and (4) means to measure fish.

It will be obvious to those skilled in the art that various changes may be made without departing from the spirit of the invention, and therefore, the invention is not limited to what is shown and described in the specification but only as defined in the appended claims.

What is claimed as new is:

1. A fishing tool comprising an elongated, rigid body member and clamp means intermediate of said body member and extending laterally from one side thereof, said elongated body member including an elongated grooved portion extending the entire length thereof and disposed behind said clamp means, said body member including a surface portion at one end of said body member extending from the side opposite said grooved portion into intersecting relation with said grooved portion, said body member including a substantially U-shaped portion opening into said one end and extending into said surface portion, said body member including a secondary notch portion intermediate of said U-shaped portion and opening into said one end, said body member including a second grooved portion extending from said second notch portion along said surface portion whereby said clamp means perimts said tool to be detachably mounted on a fishing rod and said secondary notch and groove will protectively receive a hook barb therebeneath; said U-shaped notch portion will support a rod angularly from a support surface when inserted in the support surface and extends vertically therefrom and provides guide means when the tool is used as a disgorging device.

2. The structure of claim 1 in which said clamp means comprises lateral finger portions integral with said body member.

3. The structure of claim 1 in which said body member includes a ground penetrable terminal point opposite the said U-shaped portion.

References Cited in the file of this patent

UNITED STATES PATENTS

| | | |
|---|---|---|
| 1,388,187 | Marble | Aug. 23, 1921 |
| 2,028,477 | Rupp | Jan. 21, 1936 |
| 2,164,907 | Falkner | July 4, 1939 |
| 2,445,620 | Ketland | July 20, 1948 |
| 2,492,799 | Holland | Dec. 27, 1949 |
| 2,765,535 | Weber | Oct. 9, 1956 |
| 2,791,054 | Gronek | May 7, 1957 |